United States Patent [19]

Stepan

[11] Patent Number: 5,243,882
[45] Date of Patent: * Sep. 14, 1993

[54] ROTARY WIRE STRIPPER

[76] Inventor: Jiri Stepan, St. Gallerstrasse 76, CH-7320 Sargans, Switzerland

[*] Notice: The portion of the term of this patent subsequent to May 24, 2005 has been disclaimed.

[21] Appl. No.: 770,122

[22] Filed: Oct. 2, 1991

Related U.S. Application Data

[63] Continuation of Ser. No. 619,720, Nov. 29, 1990, Pat. No. 5,111,720, which is a continuation of Ser. No. 449,545, Dec. 12, 1989, Pat. No. 4,981,054, which is a continuation of Ser. No. 183,782, Apr. 20, 1988, Pat. No. 4,920,830, which is a continuation of Ser. No. 832,463, Feb. 21, 1986, Pat. No. 4,745,828.

[30] Foreign Application Priority Data

Feb. 22, 1985 [CH] Switzerland ............ 815/85

[51] Int. Cl.⁵ ............................................. H02G 1/12
[52] U.S. Cl. ................................. 81/9.51; 81/9.42
[58] Field of Search .................. 81/9.4, 9.41–9.44, 81/9.51; 29/564.4; 30/90.1, 91.2

[56] References Cited

U.S. PATENT DOCUMENTS 3,838,612 10/1974 Inami ........................ 81/9.51
3,881,374 5/1975 Gudmestad ............... 81/9.51

FOREIGN PATENT DOCUMENTS

| | | |
|---|---|---|
| 2817727 | 1/1981 | Fed. Rep. of Germany . |
| 0451693 | 1/1970 | Japan . |
| 0466682 | 12/1971 | Japan . |
| 48-97672 | 2/1972 | Japan . |
| 52-144384 | 4/1976 | Japan . |
| 52-150581 | 12/1977 | Japan . |
| 54-173975 | 5/1978 | Japan . |
| 53-91389 | 8/1978 | Japan . |
| 54-33103 | 10/1979 | Japan . |
| 1069050 | 1/1984 | U.S.S.R. ............ 81/9.4 |

Primary Examiner—D. S. Meislin
Attorney, Agent, or Firm—Ostrolenk, Faber, Gerb & Soffen

[57] ABSTRACT

A device for the mechanical stripping of at least two layers of electrical or optical cables has a stop for a fed-in conductor. The conductor is fixed in position by clamping jaws, whereupon its insulation can be severed by at least one rotating stripping blade. Disposed immediately next to each blade is a centering jaw, which centers the conductor. The jaw is radially movable relative to the blade so as to permit the penetration of the blade into the layer of insulation. The blades and the centering jaws are positioned axially and the desired cutting depth of each of at least two stripping operations is adjusted by spindles, each of which is operated by a motor which is controlled by a digital controller.

18 Claims, 3 Drawing Sheets

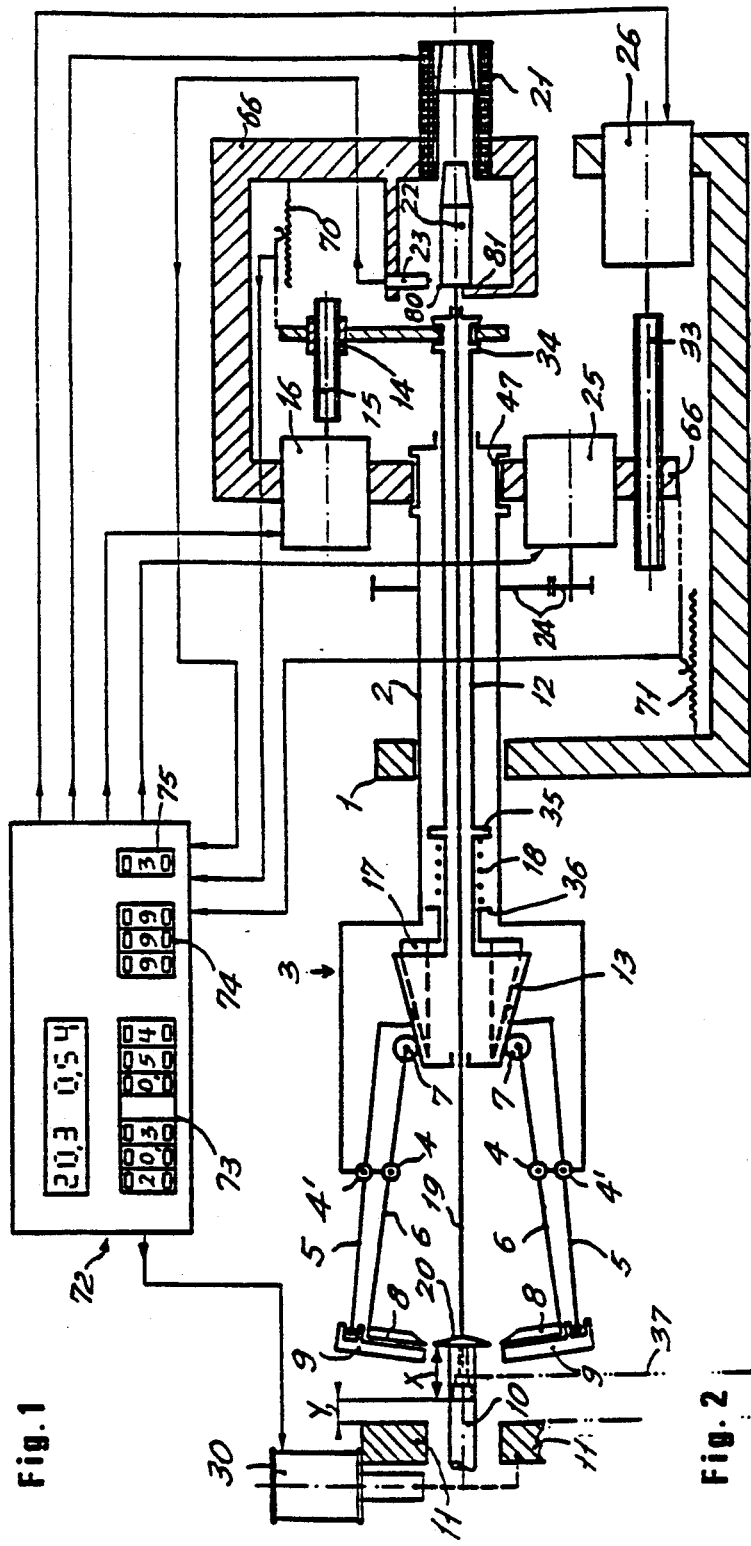
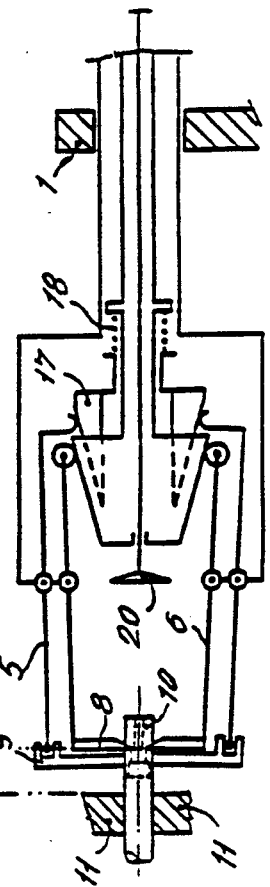
Fig. 1
Fig. 2

ROTARY WIRE STRIPPER

CROSS-REFERENCE TO RELATED APPLICATION

This is a continuation of application Ser. No. 07/619,720, filed Nov. 29, 1990, now U.S. Pat. No. 5,111,720, which is a continuation of application Ser. No. 07/449,545, filed Dec. 12, 1989, now U.S. Pat. No. 4,981,054, which is a continuation of application Ser. No. 07/183,782, filed Apr. 20, 1988, now U.S. Pat. No. 4,920,830, which is a continuation of U.S. application Ser. No. 06/832,463, filed Feb. 21, 1986, now U.S. Pat. No. 4,745,828.

BACKGROUND OF THE INVENTION

This invention relates, generally, to a wire stripper, and more particularly to a wire stripper having rotary cutting blades. From U.S. Pat. No. 3,881,374 (Gudmosted) it is known to provide, centering jaws having a prismatic holding surface into which the blade, which is firmly joined with the centering jaws, projects. The centering jaws are arranged in front of the blade as viewed from the end of the conductor. However, such a construction has disadvantages in that it can be adjusted only for a single conductor diameter and for stripping a single layer of material. Further, it must be readjusted for other diameters and/or each further stripping operation in a complicated manner. Further, the prismatic surfaces render the use of the device for a larger conductor diameter range impossible.

On the other hand, a wire stripper in which the ventering jaws are replaced by a bush which cannot be moved radially and into which the conductor must be inserted by hand, and which also fits only for one operation, has already been proposed in U.S. Pat. No. 2,645,959 (Fuchs et al). In that patent, axially sprung twisting jaws are arranged immediately next to the blade. However, they cannot serve as centering jaws because when the blade penetrates into the material, the springs are pressed back by the displacement of the material.

SUMMARY OF THE INVENTION

It is an object of the present invention to provide a wire stripping device of the type mentioned above that can be used universally for various dimensions and/or for multi-step wire stripping with the wire being stabilized immediately next to the blade, thereby preventing it from yielding during a cutting operation. It is also an object to provide a device for removing at least one layer from electrical or optical cables. It includes a stop for the fed-in conductor. The layers of the cable can be severed by at least one stripping blade that is rotatable around the axis of the conductor. The conductor is capable of being fixed in its axial position by clamping jaws that are arranged directly next to the blades. At least along a part of the radial travel of the blades, and independent of the radial travel of the blades, centering jaws are movable and can be brought radially into position against the conductor by a positively acting actuating device, especially by means of a spring movement. The centering jaws are positively fixable in this position, especially by at least a first bevel surface.

It is another object to provide a device having centering jaws which can be moved radially so that the device can be used for different conductor diameters. It is another object to have blades which are radially movable independent of the centering jaws so that the device can be used for different incision depths which is an essential prerequisite for multi-step stripping operations. It is a further object to have a device where the centering jaws are held positively in cutting position, despite any unavoidable vibration of the conductor which may otherwise impede or prevent exact cutting. Another object is to have blades which are also automatically positively guided to assure cutting accuracy wherein the centering jaws are disposed just behind the blades so as to enable precise working, even with very short stripping lengths.

The holding surfaces of the centering jaws of the present invention are straight, or only slightly concave, so that the curvature does not obstruct conductors of especially small diameter from being fixed between the holding surfaces. It has been found that they must possibly be so narrow or axially offset from one another by the thickness of the material such that they accomplish their function even in the case of small conductor diameters.

Since a long length conductor has the tendency to roll out from between the centering jaws, in the direction of rotation, the holding surface of the centering jaws should first have a smooth consistency on one side, and then after the middle, have a toothed or rough consistency. The centering jaws should also rest lightly but unyieldingly against the surface of the conductor.

In place of the spring for the axial actuation of the centering jaws, magnetic, fluidic or gravitational operation of the jaws can be used. After the positive positioning against the conductor, positive retention of the position of the centering jaws on the surface of the conductor by a self-inhibiting wedge effect is assured by the taper angle of the tapered surfaces.

It is also expedient for the rotary drive and/or the axial actuation of the blade and of the centering jaws to be provided in unison. A rotary cut provides a clean and exact cut regardless of the condition of the blade, even with blades with small nicks. The design is simplified by providing a single drive for both parts. By rotation of the centering jaws, during the rotation of the blades, the jaws are always able to remain in the immediate vicinity of the blades, which advantageously provides a more accurate cut.

The distance from the cutting line of the blade to the side of the centering jaws facing the blade should expediently not exceed the diameter of the conductor, and should preferably be a maximum of 0.1 to 0.5 times the diameter of the conductor. The portion of the conductor involved in the cutting operation is thereby kept so short that it cannot bend, even if the blade should attempt to give way over a layer of shielding wires. This also assures that when the blade cuts into the material, the conductor does not yield and cannot bend, thereby preventing the blades from cutting to non-uniform depths relative to the axis of the conductor.

In the present invention the stop also has an important function. According to U.S. Pat. No. 3,881,374 no stop is provided at all; while in U.S. Pat. No. 2,645,959 the stop is adjustable relative to the blades. However, according to the present invention, when the conductor is introduced, it is always in the same position, for example in the zero position of the blades. The clamping jaws then grip the introduced conductor, the stop retracts and the blades and the centering jaws move into the preprogrammed stripping length position. The head assembly always travels only the absolutely necessary length, which can be shortened further if the zero position of the blades is in the middle between the end of the conductor and the longest stripping length.

For radial fixation of the centering jaws, at least one axially movable bevel surface, formed e.g. by a wedge or a cone, which engages levers associated with the centering jaws, is provided. However, an axially symmetrical arrangement of several such bevel surfaces is preferred. This assures that the connection between the wedge surface and the lever is necessarily a positive one, if the respective part is to be guided against the surface of the conductor. Conversely, the lifting off of the wedge surface can be non-positive, insofar as the wedge surface is not formed by a positively acting groove in which a cam follower pin at the end of the arm engages.

In addition, a further wedge or the like can be provided for the actuation of the blade, especially when the actuating device is at least partially common to the centering jaws and the blade.

Since the centering jaws and the blade should be arranged as close to one another as possible, it is advantageous for the levers to be arranged in directly adjacent, preferably coaxial pivot bearings in order that they can be assigned paths of movement extending as parallel to one another as possible, and so that they do not mutually obstruct the movement of one another. For this purpose, it can be beneficial for the centering jaws and blades to be arranged on levers that are arranged in planes which are about parallel, possibly coaxially in respective surfaces which are curved correspondingly to one another. This parallelism can naturally be only approximate, because the two parts move relative to one another and in any case they will get out of complete parallelism with one another. Moreover, minor tolerances are naturally also possible.

BRIEF DESCRIPTION OF THE DRAWINGS

Further details of the invention are shown in connection with an embodiment shown schematically in the drawings, in which:

FIG. 1 is a schematic diagram of an example of an embodiment of the invention;

FIG. 2 illustrates the left part of FIG. 1 in the actuated position;

FIG. 5a is a cross section along the line 5a-5a' in FIG. 5b, and FIG. 5b is a cross section along the line 5b-5b' in FIG. 5a.

DETAILED DESCRIPTION OF THE PREFERRED EMBODIMENTS

Figure 3:
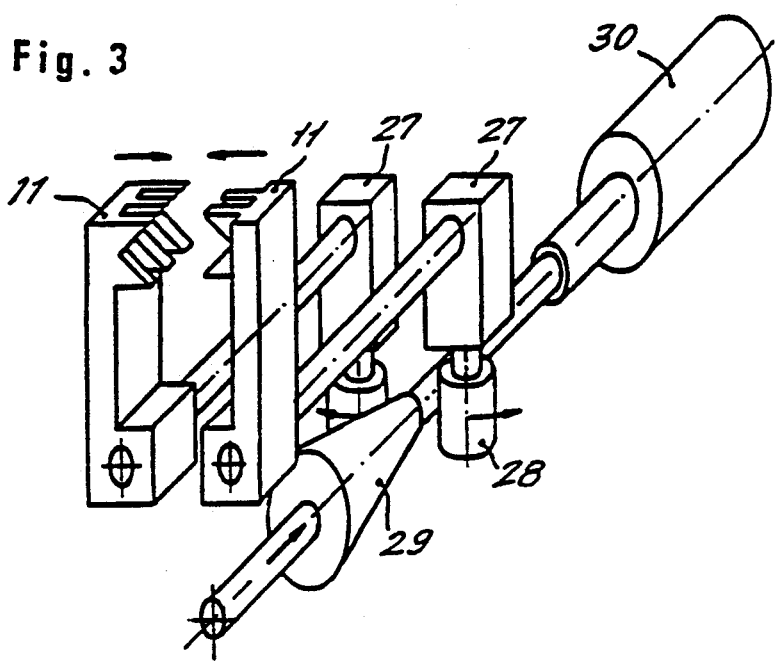
FIG. 3 is a perspective representation of a further detail of FIG. 1.

As shown in FIG. 1 a hollow shaft 2 which at its left end carries a stripping head assembly 3 is mounted in a case 1. The head assembly 3 includes a pair of opposing, two-armed rigid levers 5 and 6 which are mounted in pivot bearings 4,4'.

The levers 5 are supported at their end at the right by skids which ride on an actuation bevel. The actuation bevel comprises a wedge 17 (shown in dashed lines) which is movable axially and coaxially to hollow shaft 2. The right ends of the levers 6 rest with cam follower rollers 7 against a similar double wedge or truncated cone 13. The skid or the roller rests against these bevel surfaces either under their own weight, or under the action of a spring, not shown. Slots extend along the respective bevel surfaces in which cam follower pins or rollers engage from the side, thereby positively guiding the levers 5, 6, or only one may be used. In this embodiment of the invention, the pivot bearings 4' are located distant from the skids which ride on the bevel surface of the wedge 17, here about half-way to the centering jaws 9. The advantageous leverage characteristics due to this arrangement, along with the substantial rigidity of the levers 5, the friction of the skids on the bevel surface of the wedge 17, and the small angle of inclination of the bevel surface, inhibit any radially outward force on the centering jaws 9 from causing any corresponding movement of the wedge 17.

The device is controlled by a digital controller 72 with a sequence of selector wheels 73 for adjusting the stripping lengths and severing depths, and a sequence of selector wheels 74 for the memory addresses of these values, and a selector wheel 75 for adjusting the desired number of insulation stripping steps. The centering jaws 9 and the blades 8 could also be positioned by means of DC motors with decoders instead of a potentiometer, or by means of stepping motors.

In order to bring the centering jaws 9 and the blades 8 out of their positions shown in FIG. 1 and into those shown in FIG. 2, an actuation device for the wedges 13, 17 including a thrust tube 12 is provided. The right end of the actuation device is mounted in a thrust bearing 34 connected with the inside thread segment 14. A spindle 15 which can be driven by a motor 16 is screwed into the inside thread in order to be able to move the inside thread segment 14 along the spindle 15, to thereby move the thrust tube 12 axially.

The wedge 17 is also actuated by the thrust tube 12. The double wedge 13 expediently has one or two recesses extending in the axial direction in which the wedge 17 can be moved. However, since the centering jaws 9 need only bear against the insulated surface of the conductor 10, while the blades 8 must penetrate into the layer of insulation and possibly also a shield, these two parts 8, 9 must be able to move relative to one another in the radial direction. It is therefore expedient for the wedge 17 to be actuated positively. This is recommended to be carried out independently of the common actuation and also in view of tolerances of the soft insulation surface of the conductor 10.

For this purpose, the thrust tube 12 has a collar 35 against which one end of a spring 18 bears. The other end of the spring bears against flange 36 of the wedge 17. Conversely, the thrust tube 12 is rigidly connected with the double wedge 13, so that it can be moved into a preadjusted position, while the centering jaws 9 have already been moved into position against the surface of the insulation of conductor 10 which thereby resists further axial movement of the wedge 17. The differential movement is compensated by the compression of the spring 18. In place of the spring 18, any compensating device producing positive positioning of the centering jaws 9 on the insulated surface of the conductor 10, for example an air cushion consisting of a cylinder-piston assembly, can be used.

When the thrust tube 12 is moved to the left by the drive elements 14-16, it is apparent that the bevel surfaces of the wedges 13, 17 will have a positive drive action upon the levers 5, 6, which thereby pivot out of the positions shown in FIG. 1 into the ones shown in FIG. 2. This is accomplished by the 2-arm design of the levers 5, 6. Otherwise, it would only be possible to accomplish one positive action movement by the action of a correspondingly rated spring, or a positive action movement provided by a groove or slot guide with a greater space requirement.

In FIG. 1 another drive with a motor 25 is shown which, via a gearwheel pair 24, rotates the shaft 2. This thereby causes the head assembly 3 to rotate, so as to be able to execute a rotational cut through the insulation or the shield of the conductor 10. A single rotation of the shaft 2 is sufficient, even though it may possibly be desirable to interrupt the rotational movement while the middle layer is being stripped.

As shown in FIG. 3, the clamping jaws 11 are mounted on levers 27 which are connected to cam follower rollers 28. The damping clamping jaws 11 are actuated by an eletromagnet 30. Wedge-shaped cam surfaces are provided on a cone 29, and the rollers 28 press against the surfaces under the action of a force-application device, such as a pull spring tensioned between them. When the cone 29 is attracted by the magnet 30, the larger diameter portion of the cone 29 will move between the two rollers 28 and force them apart as shown by the arrows in FIG. 3, while moving jaws 11 together. The opposed movement of the clamping jaws 11 takes place positively under the pressure of the cone 29, whereas the opening movement of the clamping jaws occurs non-positively under the action of the force-application device or spring (not shown). In place of the magnet 30 any other motorized drive can naturally also be used, and may be in the form of a spindle which can be driven by a motor.

The device according to the present invention functions as follows:

The desired stripping lengths and severing depths are stored in digital controller 72. They can be called up by insertion of the conductor 10 up to the stop 20 between the opened clamping jaws 11. Through the rod 19, which extends along the axis of rotation of the device, the stop 20 moves the end piece 22 such that its edge 80 is scanned by sensor 23. The signal of the sensor 23 is processed in the digital controller 72, and causes the following process steps to occur:

1. The current to electromagnet 30 is turned on. This pulls the cone 29 to cause the clamping jaws 11 to close, via the cone 29, the rollers 28 and the levers 27 (FIG. 3). Because of the prismatic shape of the clamping surfaces of the jaws 11, the conductor 10 is clamped and centered precisely along the axis of rotation.

2. The stop 20 is then retracted by the rod 19. The rod 19 is drawn to the right, as seen in FIG. 1, by an end piece 22 which moves into the immersion magnets 21 to the right by actuation of said magnets 21, whereby the stop moves out of the working space.

3. The motor 26 is then started, whereby the cutting line of the blades 8 is brought via the spindle 33, the frame 66, the thrust bearing 47, the hollow shaft 2 and the lever 6, into the first stripping position 37. This position is monitored by potentiometer 71.

4. After this position is reached, the current to motor 25 is turned on. This sets in rotation the head assembly 3 with the blades 8 and the centering jaws 9 via the gearwheel pair 24.

5. At the same time, motor 16 is started so that the blades 8 are brought into the preprogrammed cutting depth via parts 4, 6, 7, 12-15 and the thrust bearing 34. In this closing process, the centering jaws 9 also move via 5, 4', 17, 18, 35 and 36 to the surface of the conductor, and thereby center the conductor 10 in the immediate area of the future cut. On the first slight resistance occuring from the contact of the centering jaws 9 with the surface of the conductor 10, the axial movement of the wedge 17 is braked by the lever 5. The spring 18 is compressed because the thrust tube 12 is still moving, until the preadjusted cutting depth in the conductor 10 is attained (FIG. 2). This position is monitored by potentiometer 70. By the rotation of blades 8, the layers to be stripped are severed circularly.

The contact of the centering jaws 9 and the concentric gripping of the conductor 10, directly next to the blades 8, also assures that during stripping, the conductor 10 cannot be cut to an unequal depth due to vibrations or due to a blade jumping over shielding residues, i.e. there will not be a deeper cut by one blade of the blade pair, relative to the axis, than by the other blade.

6. After the preadjusted severing depth is reached, the motor 26 is controlled by the digital controller 72 to retract the head assembly 3 in the opposite axial direction, thereby pulling off the severed layer, from the conductor.

7. The blades 8 and the centering jaws 9 are then opened again in the reverse sense by the control of the motor 16.

8. The process steps 3 to 7 described above are repeated for each planned stripping operation.

9. As a final step the magnets 21 and 30 are turned off, which opens the clamping jaws 11. The conductor 10 is released. The stop 20 jumps back, caused by the force of a spring not shown, until the edge 80 of the end piece 22 is again resting on the surface 81. The device is thereby made ready for the next stripping operation.

After the desired program is called up by the sequence of selector wheels 74, the head assembly 3 along with the blades 8 and the stop 20, automatically goes into the starting position as given by the maximum stripping length x of the program and the distance (which in FIG. 1 is designated as y) between the centering jaws 9 and the clamping jaws 11. This distance ensures that upon closing, the centering jaws 9 do not touch the clamping jaws 11, and also that the stop 20 is always within the blade line. This arrangement assures that the stripping head assembly travels only the absolutely necessary distance in the axial direction, which, with regard to wear and working speed, is of great significance.

Figure 4:
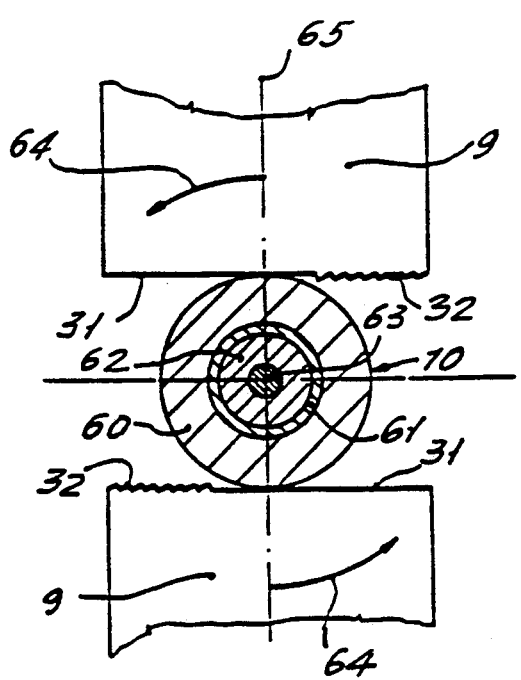
FIG. 4 is an end view of the centering jaws, with a cross section through a coaxial cable to be stripped.

The action of the centering jaws 9 should expediently not only extend to the center of the conductor 10 but to the middle from above and below (referring to FIG. 1). In rotational cutting lateral centering is also desired. However, since conductors of different diameters are to be stripped, for many applications it would not suffice to provide the centering jaws 9 with prismatic surfaces analogous to the clamping jaws (of FIG. 3). Therefore, a preferred cutting embodiment is used as shown in FIG. 4. The conductor 10 has an outer layer of insulation 60, shielding 61 and a dielectric 62 which enclose the wire 63. Since the blades 8 are situated essentially parallel to the centering jaws 9, during the execution of the rotational cut, the conductor can easily roll out to the side between the surfaces 31, 32 of the centering jaws 9 unless additional counteracting measures are taken. This undesired rolling can be avoided by providing the gripping surfaces 31, 32 in the direction of rotation (64) of the centering jaws 9, with an essentially smooth surface section 31 at the front, which is followed by a rough, preferably serrated surface section 32. The teeth extend transverse to the direction of rotation 64 or parallel to the longitudinal axis of the conductor 10. It has proven expedient to extend the smooth section 31 from one side of the centering jaw 9 to beyond its longitudinal axis or beyond a plane defined by this axis 65 and the longitudinal axis of the conductor 10.

The conductor 10 is thereby held in the centered condition shown by the smooth surface 31, but gripped by the teeth of section 32 as soon as it exhibits even the slightest tendency to retreat or roll away to the side.

Figure 6:
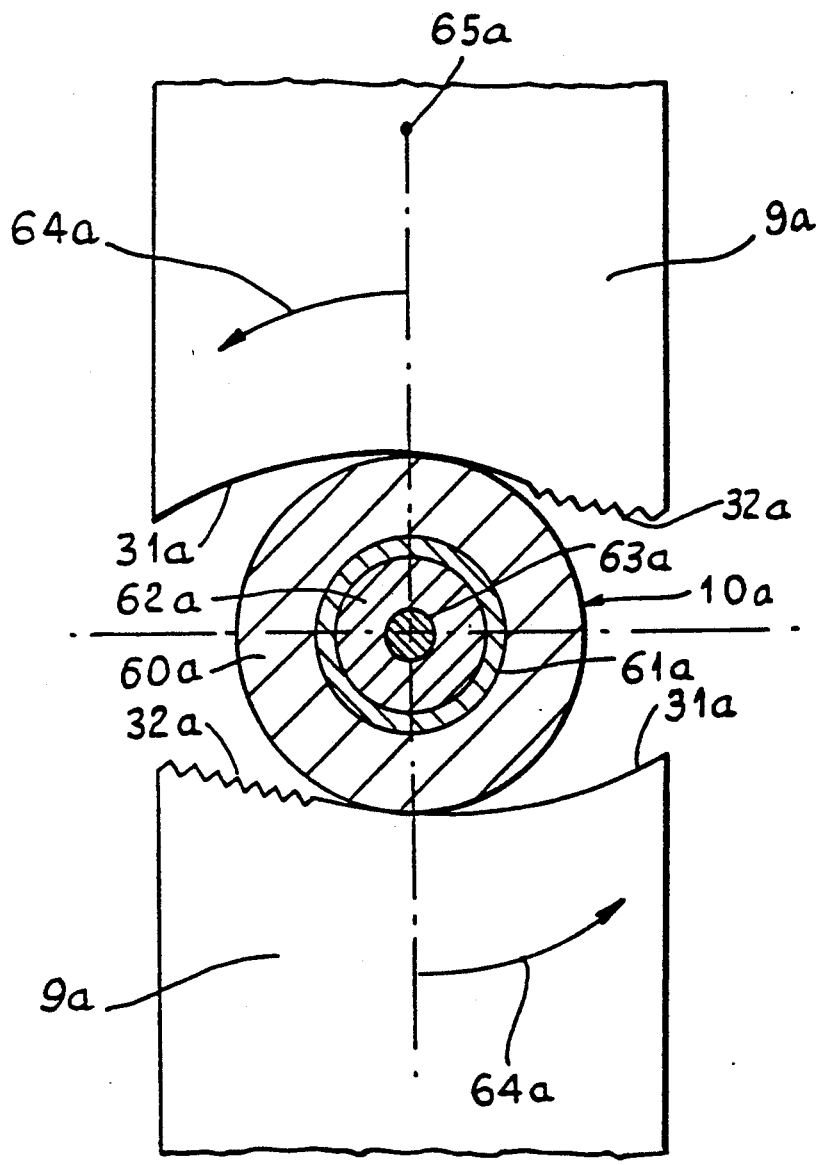
FIG. 6 is an end view of the centering jaws according to an alternate embodiment, in which the centering jaws have a concavely curved shape for partially surrounding the cable.

FIG. 6 shows an alternate embodiment of the invention in which the centering jaws have a concavely curved shape for partially surrounding the cable to be stripped. Other than the shape of the jaws, the embodiment of FIG. 6 is similar to that of FIG. 4. Therefore, the operation of the FIG. 6 embodiment will be understood in view of the preceding description relative to FIG. 4.

Figure 5A:
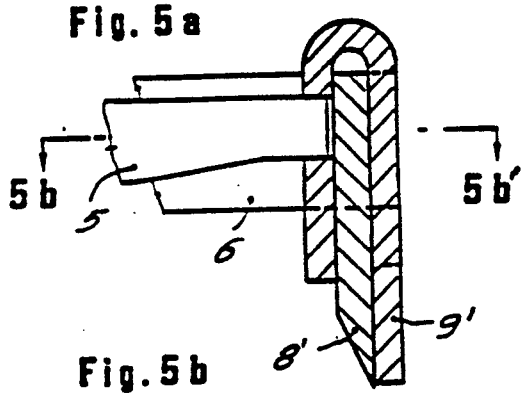
FIG. 5a and 5b show a special embodiment of the combination of a blade and a centering jaw according to the present invention where
Figure 5B:
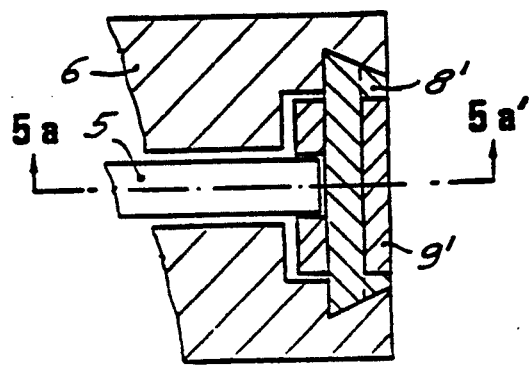

As shown in FIG. 5b, the blade 8' has a lateral cross-sectional u-shape, with the exception of the cutting edge. The u-shaped blade 8' enclasps one leg of centering jaw 9, as shown in FIG. 5b. Jaw 9' is also u-shaped, but in the longitudinal cross-section (top-to-bottom as seen in FIG. 5a). The other leg of the blade 8' is affixed to the lever 5 as shown in FIG. 5b. The blade 8' is held by its outer dovetail shape in lever 6. The centering jaw 9' slides into the opening in blade 8'.

What is claimed is:

1. A device for removing at least two layers from electrical or optical cable, comprising:
   frame means;
   a blade mounted on the frame means and movable radially with respect to the cable into contact with each of said layers of the cable to be removed, to cut through said layers of the cable;
   clamping jaws mounted on the frame means and movable into clamping engagement with the cable, thereby axially fixing the cable relative to the frame means;
   centering means mounted on the frame means and disposed axially of the cable in a location near the blade, thereby radially holding and positioning the cable with respect to the clamping jaws and the blade;
   drive means for moving the centering means radially into engagement against the cable, independently of the radial movement of the blade with respect to the cable, said drive means comprising:
   first camming means operatively connected with the centering means, which receives a first motive force from a first drive means mounted on said frame means and changes the direction of said force to move said centering means into controlled symmetrical centering engagement with the cable; and
   means for moving the blade radially toward the cable, comprising second camming means operatively connected to said blade, said second camming means receiving a second motive force from a second drive means mounted on said frame means and changing the direction of said force to move said blade radially to contact said layer of the cable to be removed.

2. A device for removing at least two layers from an electrical or optical cable, comprising:
   support means;
   frame means;
   clamping jaw means mounted on the frame means and being movable into clamping engagement with the cable for fixing the cable in an axial position with a free end of the cable at a predetermined terminal position relative to the frame means;
   blade means mounted on said support means and being movable in radial direction with respect to said cable for movement into contact with said layers of the cable to be removed;
   means for actuating the blade means to sever said layers to be removed around the cable;
   centering jaw means mounted on said support means and being movable in radial direction with respect to said cable for movement into contact with the cable layer at a location on the cable axially near the blade means;
   first actuating means for moving the centering jaw means radially toward the cable into engagement with the same for radially holding and positioning the cable with respect to the blade means, and for placing the centering jaw means directly next to the blade means when the centering jaw means clamp the cable;
   second actuating means for moving the blade means radially towards the cable into at least two different preselectable positions, said second actuating means comprising a bevel surface spaced in axial directional of the cable from the blade means, and follower means attached to the blade means and engaging said bevel surface, the latter being oriented in such a manner that upon movement of the bevel surface in axial direction of the cable with respect to said support means, the blade means is moved in radial direction relatively to the cable;
   the bevel surface being supported on said support means and being adapted to be set in at least three different positions with respect to the free end of the cable;
   third actuating means for moving said support means axially with respect to the end of the cable; and
   electronic means for memorizing said pre-selectable positions and controlling said actuating means; and
   said support means being mounted on said frame means so as to be slidable in axial direction with respect to said cable; said frame means also bearing said third actuating means; and further comprising:
   input means connected to said electronic means for feeding length and depth data into said electronic means, and sensing means for sensing the axial position of said support means, said sensing means being connected to said electronic means.

3. A device for removing at-least two layers from a cable, comprising
   frame means;
   blade means mounted on said frame means;
   centering means for centering the cable with respect to the blade means, comprising at least a pair of opposed centering jaws which engage the cable at a location axially near the blade means;

first actuating means for actuating the blade means to sever said at least two layers to be removed;

second actuating means for moving the blade means radially toward the cable into at least two different preselectable radial positions with respect to said cable, for contacting said at least two layers of the cable to be removed; and electronic means for storing said at least two different preselectable radial positions and controlling at least said second actuating means; and wherein said second actuating means further moves the centering laws radially into engagement with the cable for radially positioning the cable with respect to the blade means; said second actuating means comprising a single drive motor which causes both said centering jaws and said blade means to move radially toward the cable; said second actuating means further including at least one spring which receives a force from said drive motor and applies a force to urge said centering jaws radially toward said cable; said at least one spring having first and second ends, the first end being linked to said second actuating means so as to move in response to movement of said second actuating means, and the second end of said spring urging said bevel surface axially with respect to said cable in order to urge said centering means radially toward said cable.

4. A device for removing at least two layers from a cable, comprising frame means;

blade means mounted on said frame means;

centering means for centering the cable with respect to the blade means, comprising at least a pair of opposed centering jaws which engage the cable at a location axially near the blade means;

first actuating means for actuating the blade means to sever said at least two layers to be removed;

second actuating means for moving the blade means radially toward the cable into at least two different preselectable radial positions with respect to said cable, for contacting said at least two layers of the cable to be removed, and further moving the centering jaws radially into engagement with the cable for radially positioning the cable with respect to the blade means; and electronic means for storing said at least two different preselectable radial positions and controlling at least said second actuating means.

5. A device for removing at least two layers from a cable, comprising frame means; blade means mounted on said frame means; said blade means comprising centering means; first actuating means for actuating the blade means to sever said at least two layers to be removed; second actuating means for moving the blade means radially toward the cable into at least two different preselectable radial positions with respect to said cable for contacting said at least two layers of the cable to be removed; third actuating means for moving the blade means axially with respect to the cable into at least two different preselectable axial positions with respect to said cable for positioning the blade means at least at two different axial positions with respect to said cable where said cable is to be severed; and means for storing at least said two different preselectable radial positions and axial positions and controlling at least said second and third actuating means.

6. A device for removing at least one layer from a cable, comprising frame means; blade means mounted on said frame means; first actuating means for actuating the blade means to sever said at least one layer to be removed; second actuating means for moving the blade means radially toward the cable into at least one preselectable radial position with respect to said cable, for contacting said at least one layer of the cable to be removed; third actuating means for moving the blade means axially with respect to the cable into at least one preselectable axial position with respect to said cable for determining a preselected length of said at least one layer of the cable to be removed; electronic storing means for storing said at least one preselectable radial and axial positions with respect to said cable; and sensor means connected with said electronic storing means for determining at least one axial position of said blade means with respect to said cable.

7. A device as in claim 6, further comprising carriage means mounted on said frame means so as to be movable in axial direction with respect to said cable; said blade means being mounted on said carriage means.

8. A device as in claim 6, further comprising input means on said frame means for entering axial and radial position data into said electronic storing means; and electronic positioning means for controlling at least said third actuating means for moving the blade means axially with respect to the cable to said at least one axial position with respect to said cable.

9. A device for removing at least two layers from a cable comprising frame means; blade means mounted on said frame means; first actuating means for actuating the blade means to sever said at least two layers to be removed; guide means in the direct vicinity of said blade means for guiding said cable radially with respect to the axis of said cable; second actuating means for moving the blade means radially toward the cable into at least two different preselectable radial positions with respect to said cable, for contacting said at least two layers of the cable to be removed; and electronic means for storing said at least two different preselectable radial positions and controlling at least said second actuating means.

10. A device as in claim 9, further comprising means for rotating the guide means around the axis of the cable.

11. A device for removing at least two layers from a cable, comprising:

frame means;

blade means mounted on said frame means;

actuating means for actuating the blade means to sever said at least two layers to be removed, and for moving the blade means radially toward the cable into at least two different preselectable radial positions with respect to said cable, for contacting said at least two layers of the cable to be removed; and electronic means for storing said at least two different preselectable radial positions and controlling said actuating means.

12. A device for removing at least two layers from electrical or optical cable, the device comprising:

frame means;

blade means mounted on the frame means for being movable radially with respect to the cable for movement into contact with said layers of the cable to be removed, and means for actuating the blade means to sever said layers of the cable to be removed;

clamping jaw means mounted on the frame means for being moved into clamping engagement with the cable for fixing the cable in an axial position with a free end of the cable at a predetermined terminal position relative to the frame means;

centering jaw means mounted on the frame means and disposed axially of the cable in a location near the blade means, and means for moving the centering jaw means radially of the cable into engagement with the cable for radially holding and positioning the cable with respect to the centering jaw means and the blade means, and for placing the centering jaw means so that when the centering jaw means clamp the cable, the centering jaw means are directly next to the blade means;

blade moving means for automatically moving the blade means radially toward the cable, to at least two different preselectable radial positions within the cable, comprising a bevel surface spaced axially of the cable from the blade means, the blade means having follower means attached to it that are in engagement with the bevel surface, the bevel surface being so oriented that upon movement of the bevel surface in a direction axially of the cable, the follower means is moved by the bevel surface and thereby the blade means is moved radially to contact the layer of the cable to be removed;

said bevel surface being supported on said frame means;

said blade moving means also automatically moving said blade means axially with respect to the end of the cable to at least two different pre-selectable axial positions, thereby to establish at least two respective stripping lengths of the cable and thereby establish at least two lengths of the at least two cable layers which can be removed from the cable; and means for controlling the blade moving means, to control automatically the movement of the blade means towards all of said pre-selectable positions axially and radially, with respect to the cable; said means for controlling including means for electronically storing said at least two different preselectable radial cutting positions of the blade means with respect to the cable.

13. A device for removing at least two layers from an electrical or optical cable, comprising:

frame means;

blade means mounted on said frame means and being movable in radial direction with respect to said cable for movement into contact with said layers of the cable to be removed;

clamping jaw means mounted on the frame means and being movable into clamping engagement with the cable for fixing the cable in an axial position with a free end of the cable at a predetermined terminal position relative to the frame means;

centering jaw means mounted on said frame means and being movable to a location on the cable axially near the blade means;

first actuating means for moving the centering jaw means radially towards the cable into engagement with the same for radially holding and positioning the cable with respect to the blade means and for placing the centering jaw means directly next to the blade means when the centering jaw means clamp the cable;

second actuating means for moving the blade means radially toward the cable into at least two different preselectable positions, said second actuating means comprising a bevel surface spaced in axial direction of the cable from the blade means, and follower means attached to the blade means and engaging said bevel surface, the latter being oriented in such a manner that upon movement of the bevel surface in axial direction of the cable, the blade means is moved in radial direction relatively to the cable;

a bevel surface being supported on said frame means and being adapted to be set in at least three different positions with respect to the free end of the cable;

third actuating means for moving said blade means axially with respect to the end of the cable; and electronic means for memorizing said pre-selectable radial positions and controlling at least said second actuating means.

14. Device for removing at least two layers from electrical or optical cable, the device comprising:

frame means;

blade means mounted on the frame means for being movable radially with respect to the cable for movement into contact with said layers of the cable to be removed, and means for actuating the blade means to sever said layers of the cable to be removed;

clamping jaw means mounted on the frame means for being moved into clamping engagement with the cable for fixing the cable in an axial position with a free end of the cable at a predetermined terminal position relative to the frame means;

centering means mounted on the frame means and disposed axially of the cable in a location near the blade means, and means for moving the centering means together with the blade means axially of the cable into axial position with respect to said cable at which the cable is to be centered and said layers are to be served;

blade moving means for automatically moving the blade means radially toward the cable, to at least two different pre-selectable radial positions within the cable, comprising a bevel surface spaced axially of the cable from the blade means, the blade means having follower means attached to it that are in engagement with the bevel surface, the bevel surface being so oriented that upon movement of the bevel surface in a direction axially of the cable, the follower means is moved by the bevel surface and thereby the blade means is moved radially to contact said layers of the cable to be removed;

said bevel surface being mounted in said frame means, by means permitting the bevel surface to rotate together with the blade;

said blade moving means also automatically moving said blade means axially with respect to the end of the cable to at least two different pre-selectable positions, thereby to establish at least two respective stripping lengths of the cable and thereby establish at least two lengths of the cable layer which can be removed from the cable; and means for controlling the blade moving means, to control automatically the movement of the blade means towards all of said pre-selectable positions axially and radially, with respect to the cable; said means for controlling including means for electronically storing said at least two different pre-selectable radial positions of the blade means with respect to the cable.

15. A device for removing at least two layers from an electrical or optical cable, the device comprising:

mainframe means;

frame means, movably connected to said mainframe means;

blade means mounted on said frame means for being movable radially with respect to the cable for movement into contact with said layers of the cable;

clamping jaw means mounted on said mainframe means for being moved into clamping engagement with the cable for fixing the cable in an axial position with a free end of the cable at a predetermined terminal position relative to the mainframe means;

centering means mounted on said frame means and disposed axially of the cable in a location near the blade means;

means for moving the centering means into engagement with the cable for centrically positioning the cable, with respect to the centering means, the axis of the cable and said blade means, and for placing the centering means so that when the blade means sever said layers, the centering means are directly next to the blade means; said means for moving said centering means being mounted on said frame means;

blade moving means mounted on said frame means, separated from said means for moving the centering means, for automatically moving the blade means toward the cable to at least two different pre-selectable radial positions within the cable, having follower means attached to it and connected with said blade means, the follower means being moved by the blade moving means and thereby the blade means being moved radially to contact the cable and to sever said layers;

frame moving means for automatically moving said frame means axially into at least two different pre-selectable positions, with respect to the cable and said mainframe means respectively, thereby to establish at least two respective stripping lengths of the cable and thereby establish at least two lengths of said at least two layers which can be removed from the cable; and means for controlling the blade moving means and frame moving means, to control automatically the movement of the blade means and frame means respectively toward all of said preselectable positions radially and axially respectively, with respect to the cable, said means for controlling including means for electronically storing said at least two different pre-selectable radial positions of the blade means, with respect to the cable.

16. Device for removing at least two layers from electrical or optical cable, comprising:

frame means;

a blade mounted on the frame means for being movable radially with respect to the cable into contact with each of said layers of the cable to be removed, and means for actuating the blade to cut through said layers of the cable;

clamping jaws mounted on the frame means and movable into clamping engagement with the cable, for axially fixing the cable relative to the frame means;

centering jaws mounted on the frame means and disposed axially of the cable in a location near the blade, and means for moving the centering jaws radially of the cable into engagement with the cable, directly next to the blade, for radially holding and positioning the cable with respect to the centering jaws and the blade;

means for moving the centering jaws radially into engagement against the cable and adapted to move radially of the cable independently of the radial movement of the blade with respect to the cable;

said means for moving the centering jaws radially into engagement against the cable comprising:

first camming means operatively connected with the centering jaws, which receives a first motive force from a first drive means mounted on said frame means and changes the direction of said force to move said centering jaws into controlled symmetrical clamping engagement with the cable; and first motive means for applying said first motive force to said first camming means; and means for moving the blade radially toward the cable, comprising second camming means operatively connected to said blade, said second camming means receiving a second motive force from a second drive means mounted on said frame means and changing the direction of said force to move said blade radially to contact said layers of the cable to be removed.

17. Device for removing a layer from electrical or optical cable, or the like, the device comprising:

frame means;

a stripping blade mounted on the frame means for being movable radially with respect to the cable for movement into contact with the layer of the cable, and means for actuating the blade to sever the layer of the cable;

clamping jaws mounted on the frame means for being moved into clamping engagement with the cable, for fixing the cable in an axial position with a free end of the cable at a predetermined terminal position relative to the frame means;

centering jaws mounted on the frame means and disposed axially of the cable in a location near the blade, and means for moving the centering jaws radially of the cable into engagement with the cable, for radially holding and positioning the cable with respect to the centering jaws and the blade;

the centering jaws being movable radially of the cable independently of the radial movement of the blade with respect to the cable;

the means for moving the centering jaws radially into engagement against a cable comprising:

a bevel surface in engagement with the centering jaws at an axial position that is separated from the position where the centering jaws contact the cable, such that motion of the bevel surface axially toward the cable moves the engaged centering jaws into controlled symmetrical clamping engagement with the cable;

bevel surface moving means in engagement with the bevel surface, for shifting the bevel surface to move the centering jaws into engagement with the cable;

wherein the blade has a pair of arms interconnected by a central portion, thereby defining a general U-shape in its cross-section transverse to the radial direction of movement of the blade with respect to the cable, and a respective one of the centering jaws is immediately adjacent the blade and that jaw is shaped and disposed for being clasped by the arms of the U-shaped blade; and wherein the respective centering jaw that is clasped by the blade is also generally U-shaped in the cross-section taken along the direction of radial movement of the centering jaw, and the centering jaw has one leg of its U-shape which is clasped by the blade; the blade being so oriented that it clasps the leg of the centering jaw which is away from the bevel surface; and the blade is further clasped between the legs of the centering jaw.

18. Device for removing a layer from electrical or optical cable, or the like, the device comprising:

frame means a stripping blade mounted on the frame means for being movable radially with respect to the cable for movement into contact with the layer of the cable, and means actuating the blade to sever the layer of the cable;

clamping jaws mounted on the frame means for being moved into clamping engagement with the cable for fixing the cable in an axial position with a free end of the cable at a predetermined terminal position relative to the frame means;

centering jaws mounted on the frame means and disposed axially of the cable in a location near the blade, and means for moving the centering jaws radially of the cable into engagement with the cable for radially holding and positioning the cable with respect to the centering jaws and the blade;

the centering jaws being movable radially of the cable independently of the radial movement of the blade with respect to the cable;

the means for moving the centering jaws radially into engagement against the cable comprising:

a bevel surface in engagement with the centering jaws at an axial position that is separated from the position where the centering jaws contact the cable, such that motion of the bevel surface axially of the cable moves the engaged centering jaws into clamping engagement with the cable; and bevel surface moving means in engagement with the bevel surface, for shifting the bevel surface to move the centering jaws into engagement with the cable;

the centering jaws having a width extending transverse to the axis and being wider than the diameter of the cable being clamped;

each centering jaw has a continuous jaw surface including a smooth holding surface portion for holding the cable and a roughened retaining surface portion thereon, said smooth portion and roughened portion being joined along a line parallel to the axis of the cable, said roughened surface portion preventing the cable from being shifted from between the centering jaws by said rotation of the blade with respect to the cable.

* * * * *